March 14, 1933.  H. STOLFA ET AL  1,901,852
ROCKET
Filed July 23, 1931
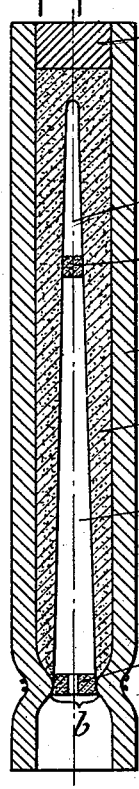
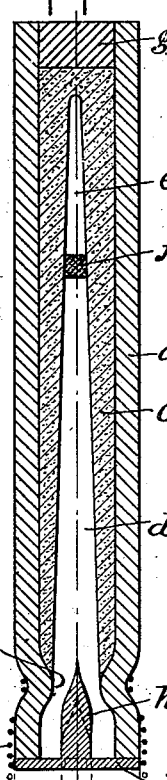
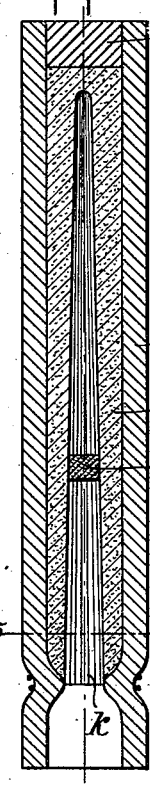
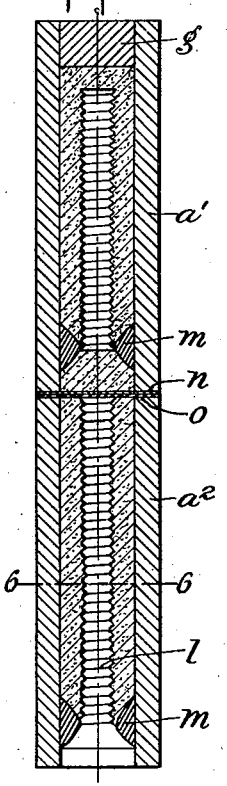
INVENTORS
HERMANN STOLFA
RUDOLF ZWERINA
BY
ATTORNEY Patented Mar. 14, 1933

1,901,852

UNITED STATES PATENT OFFICE

HERMANN STOLFA AND RUDOLF ZWERINA, OF VIENNA, AUSTRIA

ROCKET

Application filed July 23, 1931, Serial No. 552,654, and in Austria July 28, 1930.

Our invention relates to rockets, and more particularly to the type used for fire-works display purposes.

It is one of the objects of our invention to provide a construction of a rocket which permits the more satisfactory utilization of the effective energy inherent in the charge of rocket composition than has heretofore been possible with existing forms of rockets, such utilization multiplying the effective force obtainable from the combustion of the rocket composition.

According to our invention, we attain this object:

1. By bringing about, during the process of combustion, and particularly at the first stage thereof, the correct relation between the diameter of the exhaust orifice and the diameter of the combustion surface;

2. By so shaping the charge that the burning surface forming the conical or tapering bore will be the maximum surface attainable with the smallest practicable diameter and shortest length of bore; and finally, 3. By increasing, during the latter stages of the combustion process, the burning surface to an extent unobtainable from the known types of rockets.

Further, and more specific objects of our invention will be apparent from the description hereinafter and the explanation of the drawing forming part of this specification.

In said drawing, Fig. 1 is a sectional view of a rocket built in accordance with our invention, whereby an increased burning surface is obtained; Fig. 2 is a sectional view of a rocket in which the objects of our invention are attained by the provision of means to gradually increase the diameter of the exhaust orifice from a smallest initial size to a predetermined or normal fixed size; Fig. 3 shows a specific means of effecting the enlargement of the combustion surface as by providing a series of longitudinal grooves; Fig. 4 shows another specific means of increasing the combustion surface as by providing the rocket composition with hollowed channels in the nature of spiral grooves; Figs. 5 and 6 are partial sections through the bore and rocket composition along lines 5—5 and 6—6 of Figs. 3 and 4, respectively; and Figs. 7 and 8 show energy diagrams, the former illustrating the effective energy obtained from rockets as heretofore constructed, and Fig. 8 showing the effective energy obtained from rockets constructed in accordance with our invention.

Referring more particularly to the drawing, $a$ is the casing, $b$ is the exhaust orifice, $c$ is the rocket composition, $d$ is the bore or hollow chamber formed by said rocket composition, $e$ is the auxiliary chamber hereinafter to be referred to, separated by a plug $f$ of rocket composition, $g$ is the cap, $h$ is a movable pin, $i$ a guiding plate connected with said pin, and $j$ a spring connected with said guiding plate.

Rockets heretofore known contain a body consisting of a rocket composition, one section of which, namely that section which adjoins the exhaust orifice, is provided with a bore of conical or tapering outline whereas the other part, immediately adjoining and defining said bore is a body of rocket composition, usually cylindrical in shape. When rockets of this type are fired that section of the rocket composition body which surrounds the hollow space will burn first, considerable propulsion power being generated as a result of the burning off of this portion of the rocket composition body. The burning of this portion of the rocket composition is followed immediately by the burning of the remaining massive portion of the composition body, the combustion surface being no greater than the cross-sectional area along the inner diameter of the rocket, i. e. the diameter of the massive portion of the composition body. This manner of the burning of the rocket composition results in the generation of considerable propulsion power during the time that the composition is burning over a large surface, i. e. the surface of the hollow space, but results in the generation of practically no propulsion power during the burning of the massive part of the composition body. This power generation is illustrated in Fig. 7 which is a power diagram illustrating the burning of a charge of a commercial fire-works rocket which show.

(1) That at the beginning of the burning process an escape of gases produced by the burning of the rocket composition takes place without any appreciable propulsion energy being generated. In the diagram, with the ordinal representing kilograms and the abscissa representing seconds, the area under the curve will represent the amount of energy generated. Thus, due to the escape of gases at the beginning of the burning process represented in time between the points 0.0 and 0.1, very little propulsion energy is being generated.

(2) That after the rocket composition which is situated around the hollow space has been consumed (points 2 to 3 on the diagram), additional gases produced by the burning of the massive portion of the composition body will escape without, however, yielding any appreciable propulsion energy. This is illustrated by the space bounded by points 3 and 5 on Fig. 7. A substantial amount of propulsion energy is produced only during the burning of the charge which surrounds the hollow space as represented in the diagram by the area bounded by the points 1, 2, 3, and 4.

These phenomena are explained by the relation between burning surface on the one hand and the volume of the combustion chamber and the diameter of the exhaust orifice on the other hand. When the burning process commences, propulsion gases are generated by the burning of the innermost layer of the hollow space which has the shape of the frustum of a cone; these gases then escape through a space of larger, or at least of equal, diameter at the exhaust orifice of the rocket. Thus, the exhaust speed of the propulsion gases is small at the outset, and only a small amount of impulse energy is produced; this is shown graphically in the part of the diagram (Fig. 7) which is bounded by points 0 and 1. Thereafter the burning surface increases in proportion as the burning process advances from the center toward the outer casing; the diameter of the burning surface grows in relation to the diameter of the exhaust orifice; large quantities of gases are produced in the combustion chamber and as a result, high pressure, which in relation to the surrounding atmospheric pressure is super-pressure, and high exhaust speed, develop. According to the law which generally applies to rockets (rocket mass × rocket speed = mass of the combustible material simultaneously expelled × exhaust speed of the propulsion gases) this part of the combustion process will yield a large propulsion energy; this is shown in that part of diagram (Fig. 7) which is bounded by numerals 2 and 3. After the charge around the hollow channel has been consumed the burning surface decreases until it is equal to the circular cross-section of the propulsion substance, the process of combustion continuing upon the circular cross-section. At the same time the volume of the combustion chamber increases evenly, the diameter of the burning surface remaining about equal to the diameter of the gas jet at the point of relatively largest burning surface. When the burning process has reached the point at which the burning surface becomes equal to the circular cross-section of the charge quantities of gas develop, small compared with the quantity produced when the burning surface was larger, the pressure in the combustion chamber thereby becomes lower and as a further result, because of the reduction of the difference between the pressure within the combustion chamber and the pressure around the rocket, the speed at which the gases escape from the rocket, becomes lower. This in turn considerably reduces the propulsion energy, as shown in the diagram (Fig. 7) between the points 4 and 5. The obvious consequence is that because of this negligible amount of propulsion energy which at that stage is hardly measurable, the rocket will not ascend to any substantial additional height. The commercial rocket of the type and construction now generally in use reaches the highest point of ascension substantially as a result of the propulsion energy which develops during the burning of the combustible charge around the bore.

One of the objects of the invention consists in keeping down the diameter of the exhaust orifice at the beginning of the burning process, for instance, by inserting at the choke of the rocket a suitably shaped hollow cylinder $b_1$ (Fig. 1) made of rocket composition, such originally reduced diameter increasing during the burning process until the predetermined fixed diameter $b$ is reached; a gradually increasing change of diameter of the exhaust orifice from a smallest initial size to a predetermined normal (or fixed) size can be brought about by inserting a suitably shaped hollow cylinder made of rocket composition or some other suitable material into the choke of the rocket, as shown in Fig. 1. Such a hollow body burns up rapidly and completely as soon as the rocket is ignited and keeps the diameter of the exhaust orifice, particularly at the beginning of the combustion, down to a very small size, thereby causing a rapid rise of pressure within the combustion chamber which in turn produces propulsion energy which rises within a very short time to a high level, as illustrated diagrammatically in Fig. 8, between 1 and 2.

This inventive thought may be reduced to practice in the more elaborate manner shown in Fig. 2 in which $h$ is a movable pin which, under the changing action of the spring $j$ and under the pressure of the outrushing gases constantly and automatically opens or partly closes the exhaust orifice so that the pressure present in the combustion chamber at a given time increases to the highest possible point, causing the exhaust speed of the gases resulting from the burning of combustible charge to increase to a very high point, which increase in speed in turn causes the propulsion energy during almost the entire period of combustion to remain high and uniform.

A further feature of our invention consists in so shaping the part of the bore through the combustible charge which is marked $d$ and which adjoins the exhaust orifice, as to provide at a given time the largest possible burning surface consistent with the smallest possible combustion chamber volume. In order to attain this object, the cross-section of the bore $d$ at a right angle to the longitudinal axis of the rocket, must be kept small, whereby large quantities of gases are developed in the smallest possible space having the largest possible combustion space surfaces. The enlargement of the burning surface of chamber $d$ in Fig. 1 may be accomplished by various methods of which the following are illustrative examples: the bore $d$ which extends up to the closed top of the rocket and which is usually of conical or tapering shape, may either be provided with longitudinal grooves $k$, as shown in Fig. 3, when the charge is filled into the casing, or it may be provided thereafter with hollow channels similar to spiral grooves $l$, as shown in Fig. 4. Since the combustion of the combustible charge advances uniformly in all directions from the initial burning surface to the interior of the charge, the burning surface remains enlarged in the manner described until the chamber $e'$ shown in Fig. 2 with its large burning surface has been seized by the burning process.

Another important element of the invention consists in converting the massive composition body of the explosive charge into a chamber $e$ or $e'$ as shown in Figs. 1 and 2, and thereby substantially increasing the burning surface. It has been shown that the gases which are produced by the burning of the solid composition body of the explosive charge, escape without noticeable energy yield (Fig. 7, between points marked 4 and 5); when, however, this part of the charge is provided with a chamber or bore of its own, a very considerable amount of additional propulsion energy is generated (see Fig. 8 between points 4 and 5). According to our invention these chambers or bores may be obtained for instance by extending the conical or otherwise suitably shaped tapering bore $d$ beyond the length usually found in commercial rockets and by inserting into such bore a closely fitting solid prop shaped like a frustum of a cone, or in any other suitable manner, which prop may be made of the same material as the combustible charge or of some other suitable material, thereby dividing the single combustion chamber which is connected directly with the exhaust orifice, into a plurality of separate chambers which are arranged one behind the other along the longitudinal axis of the rocket. Each individual chamber is completely separated by the prop above described from the adjacent chamber or chambers, so that the ignition of the charges of the various separate chambers will take place successively, the charge in a given chamber burning off completely before the charge in the next adjacent chamber ignites, such ignition commencing at the moment when the combustible prop is consumed during the burning-off of the charge of the preceding chamber. These separate chambers may be of varying size and shape, but regard should be had to so constructing them as to attain the largest possible burning surface consistent with the smallest possible volume of burning space within each chamber. Several of the features of the invention hereinabove described, are of importance in this connection, i. e., the hollow cylinder $b'$, shown in Fig. 1, the longitudinal grooves shown in Figs. 3 and 5, and the spiral grooves shown in Figs. 4 and 6. The immediate object of inserting a hollow cylinder into the exhaust orifice, and the immediate object of the longitudinal and spiral grooves have already been described. These features, however, have an important bearing upon size and shape of the separate chambers. The hollow cylinder $b'$ of Fig. 1 causes, as already described, a rapid rise of pressure in the chamber which is ignited first; in order to obtain a similarly high amount of pressure in this chamber if not provided with said hollow cylinder, the inner surface of the chamber would have to be larger, which could be attained by increasing the cross-sectional diameter of the bore, or the length of the chamber. Either alternative would be undesirable, the first one for the reason that the amount of the explosive charge would then be smaller, and the other, because there would then not be left sufficient space for additional chambers. By using the hollow cylinder, the length of the chamber first to be ignited, can be kept down to a minimum, thereby leaving sufficient space for one or more additional chambers. The grooves have a similar auxiliary purpose; as used in the chamber first to be ignited, they increase the burning surface thereof ($d$ in Fig. 1) and it is thus possible to reduce substantially the length of said chamber and at the same time obtain an amount of energy which, without such grooves, could be obtained only from a substantially longer chamber. The hollow cylinder $b'$ of Fig. 1 may be used either alone or preferably, for best results and minimum length of the chamber first to be ignited, in combination with either longitudinal or spiral grooves. Our invention further intends to provide each additional chamber with an individual choke, as shown in Fig. 4, at $m$. In carrying out this inventive thought still further, the rocket casing may be so constructed as to cause that portion of the casing which contains a separate chamber, to fall off as soon as the charge contained in such chamber has been consumed; it is obvious that the separation of this then superfluous portion of the casing from the still active portion of the rocket lightens the weight of the rocket, thereby increasing the length of flight of the rocket and improving its balance and direction of flight.

The manner of carrying out this idea is illustrated in Fig. 4 in which $a'$ and $a^2$ are the casings of the rockets and $n$, $o$ are two discs made, for instance, of celluloid which are connected with the casings $a'$ and $a^2$ respectively and also with each other. When the rocket composition in the casing $a^2$ has been consumed the celluloid disc $o$ and the disc $n$ will be burned and the casing $a^2$ will be separated from the casing $a'$ and will fall off from said casing $a'$.

The bore $d$ shown in Figs. 1 and 2 which, as already stated, is usually conical or tapering, may not be of any desired length since burning of the charge in a bore of excessive length would cause such large quantities of gas to develop so suddenly as to cause the rocket to burst immediately after firing it. Experience has shown that the relative length of the bore as shown in Fig. 2 is the maximum length for safety. If charges of greater explosive force are to be used, the size of these bores, and particularly their length, must be curtailed correspondingly. The solid portion of the charge of a rocket constructed in accordance with the prior art is without effect, as has already been said, even if charges of very great explosive force are used. By providing a rocket with a bore $d$ of a length consistent with safety, and with additional contiguous chambers, a body of combustible material can be attained all parts of which are equally effective.

A rocket constructed according to this invention will produce an energy diagram as shown in Fig. 8; from which will be seen readily that immediately upon the commencement of the burning process propulsion energy is generated rapidly and in large amounts and that the amount of energy so generated remains a multiple of the energy yield shown in the diagram Fig. 7 up to the time of the termination of combustion.

The effectiveness of rockets constructed as described in this invention may be increased still further by using charges of varying explosive force in the different chambers, and particularly by using in each successive chamber a charge of greater force than in the preceding chamber. In selecting these charges of varying explosive force, regard must be had to the size of the chamber for which they are to be used.

It is obvious that while we have described particular embodiments of our invention, various modifications therein and in the arrangement of the parts may be made without departing from the invention; for instance, while we have described and illustrated the prop $f$ (which is inserted into the bore to form separate chambers of rocket composition and the like) as a separate element, it is obvious that an element serving the same purpose may be made integral with the main body of the combustible matter.

We claim:

1. A rocket comprising an outer casing and a body of combustible composition divided to form a plurality of chambers of varying cross-sections, the successive burning of the composition forming each chamber being effective to maintain the pressure within the combustion space in approximate proportionate relation to the gradually increasing combustion surface, whereby an increase in the energy yield from the rocket is obtained.

2. A rocket comprising an outer casing having an exhaust orifice, a body of combustible composition forming a hollow bore disposed centrally of the rocket and divided to form a plurality of chambers, and a plug having an aperture and being of a combustible composition within the exhaust orifice, the cross-sectional area of said exhaust orifice gradually increasing as said plug is burned, until the maximum cross-sectional diameter of said exhaust orifice is reached.

3. A rocket as claimed in claim 2 including means for automatically adjusting the diameter of the exhaust orifice in order to obtain, throughout the duration of the burning process, a substantially uniform amount of propulsion energy.

4. A rocket comprising a plurality of outer casings, separate bodies of combustible composition in each of said casings, and combustible means for securing said casings to each other, each casing being adapted to be detached from the casing adjacent and immediately above the same upon the burning of the combustible composition within said casing.

5. A rocket comprising a plurality of outer casings, separate bodies of combustible composition in each of said casings, and combustible means comprising two discs each attached to one of the adjacent casings and to each other, each casing being adapted to be detached from the casing adjacent and immediately above the same upon the burning of the combustible composition within said casing.

6. A rocket comprising an outer casing, a body of combustible composition, and a plug of combustible material dividing said body of combustible composition into separate chambers of varying cross-sections whereby a combustion of the composition forming the first of said chambers takes place, followed by the burning of said plug and then by the combustion of the composition forming the second of said chambers.

7. A rocket comprising an outer casing, a body of combustible composition within said casing having a passageway therein extending substantially throughout the length of the interior of said casing, and a plug of combustible material of an outer configuration identical with the configuration of said passageway approximately midway its length and dividing the same into two sections of varying cross-sectional areas whereby a combustion of the composition along the surface of the first of said sections takes place, followed by the burning of said plug and then by the combustion of the composition along the surface of the second of said sections.

8. A rocket comprising an outer casing having an exhaust orifice, a body of combustible composition within said casing having a passageway therein extending substantially throughout the length of the interior of said casing, a plug of combustible material of an outer configuration identical with the configuration of said passageway at a point approximately midway its length dividing the same into two sections, and a plug having an aperture and being of a combustible composition within the exhaust orifice gradually increasing the cross-sectional area of said exhaust orifice as said plug is burned, until the maximum cross-sectional diameter of said exhaust orifice is reached.

9. A rocket comprising an outer casing, a body of combustible composition within said casing having a passageway therein extending substantially throughout the length of the interior of said casing, and a plurality of plugs of combustible material within said passageway, each of an outer configuration identical with the configuration of said passageway at the point at which such plug is positioned within the passageway, dividing said passageway into a plurality of sections, of varying cross-sectional areas whereby a combustion of the composition along the surface of the first of said sections takes place, followed by the burning of the plug dividing said first section from the next succeeding section, then by the combustion of the composition along the surface of the second of said sections, and so on until the composition in the last of said sections has been burned.

HERMANN STOLFA.
RUDOLF ZWERINA.